United States Patent [19]

Nelson

[11] Patent Number: 4,910,948
[45] Date of Patent: Mar. 27, 1990

[54] FRONT MOUNTED DETHATCHING APPARATUS

[76] Inventor: Danny Nelson, 9214 Sappington Rd., Sappington, Mo. 63126

[21] Appl. No.: 288,977

[22] Filed: Dec. 23, 1988

[51] Int. Cl.⁴ .......................................... A01D 57/12
[52] U.S. Cl. ..................................... 56/16.1; 56/202; 172/78; 172/123; 172/343
[58] Field of Search ........................ 172/21, 27, 28, 76, 172/77, 78, 112, 118, 119, 123, 22, 810, 834, 42, 43, 343; 56/194, 198, 199, 202, 15.9, 16.1, 7, 14.7, 14.9

[56] References Cited

U.S. PATENT DOCUMENTS

| | | | |
|---|---|---|---|
| 119,628 | 10/1871 | Martin et al. | 172/343 |
| 2,194,297 | 3/1940 | Drumm | 56/15.9 X |
| 2,722,795 | 11/1955 | Warner | 56/249 |
| 2,946,169 | 6/1960 | Soteropulos | 56/16 |
| 3,099,122 | 7/1963 | Sakatani | 56/202 X |
| 3,999,316 | 12/1976 | Palmer | 172/112 X |
| 4,068,455 | 1/1978 | Zehrung Jr. et al. | 56/16.1 X |
| 4,077,190 | 3/1978 | Crites | 56/15.9 X |
| 4,307,561 | 12/1981 | Hicks | 56/15.9 |
| 4,802,536 | 2/1989 | O'Neal | 172/119 X |

FOREIGN PATENT DOCUMENTS

| | | | |
|---|---|---|---|
| 2445098 | 8/1980 | France | 172/21 |
| 0242458 | 11/1925 | United Kingdom | 56/199 |
| 1427717 | 3/1976 | United Kingdom | 172/21 |

OTHER PUBLICATIONS

Mantis Manufacturing Co., Pennsylvania, Sales Letter, Oct. 1985.

Primary Examiner—Randolph A. Reese
Assistant Examiner—Jeffrey L. Thompson
Attorney, Agent, or Firm—Laney, Dougherty, Hessin & Beavers

[57] ABSTRACT

A wheeled vehicle having a pair of forwardly projecting support arms carrying a rotary dethatching drum. A volute housing encloses the upper portion of said dethatching drum and opens for tangential forward discharge above the drum. The drum includes axially-spaced blades mounted in circumferentially staggered array upon a polygonally cross-sectioned shaft. The drum is supported upon a vertically adjustable gauge roller used to set the working depth of the dethatching blades. The dethatching drum is driven in rotation from the wheeled vehicle. L-shaped lever arms project from the wheeled vehicle toward the dethatching drum and support a foot pedal subassembly which permits the dethatching drum and its housing to be lifted upwardly by foot pressure applied by the operator.

7 Claims, 3 Drawing Sheets

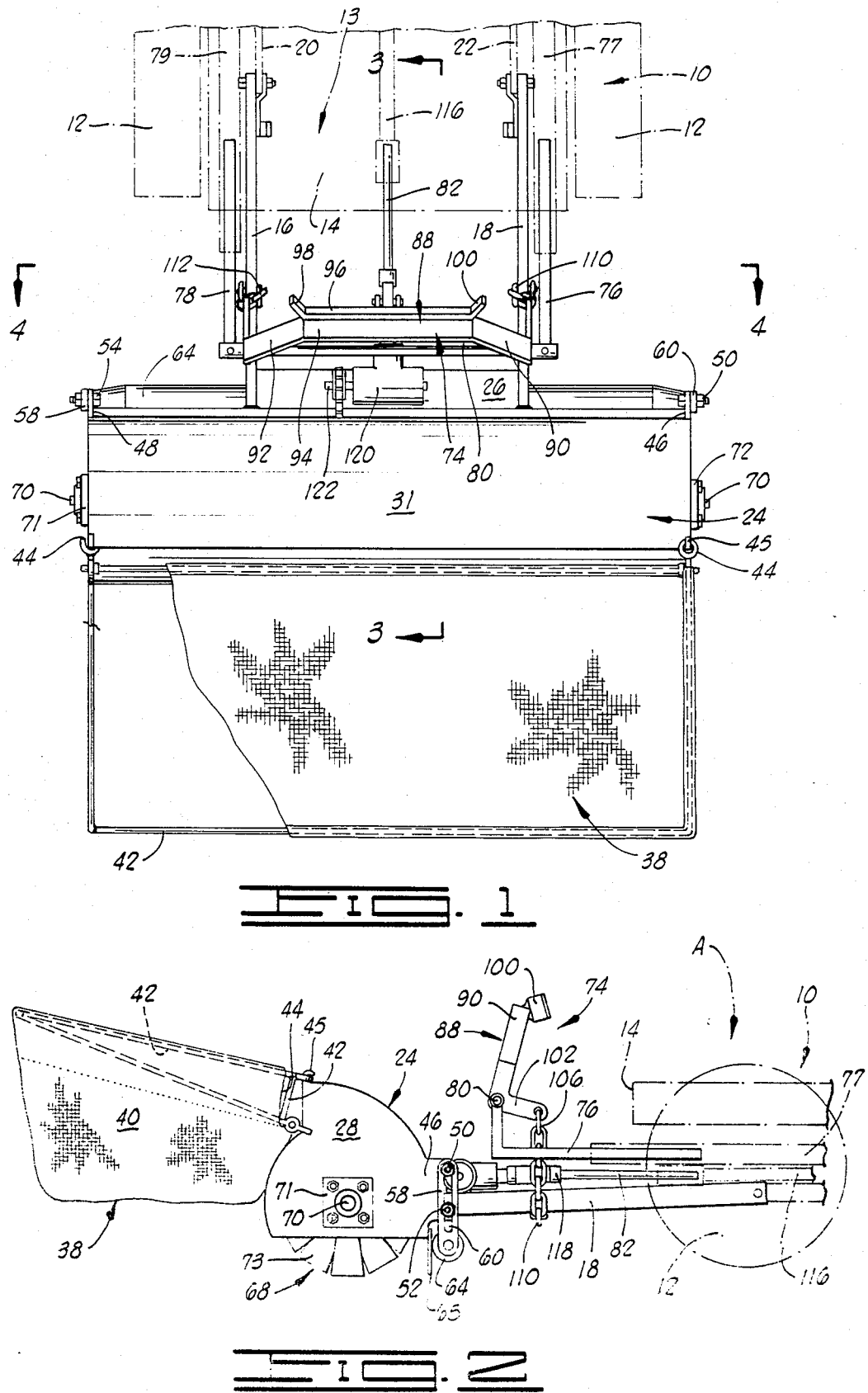

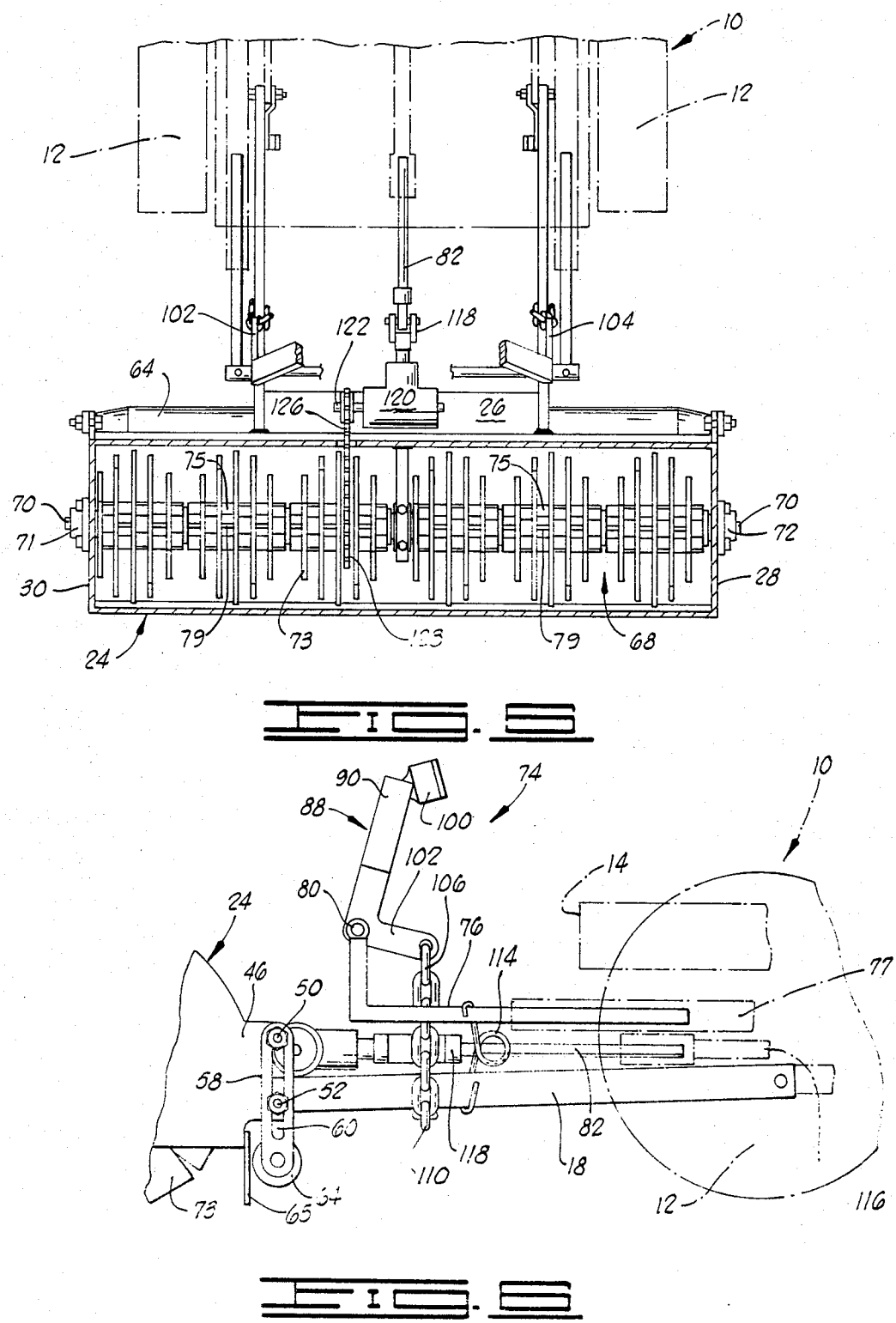

4,910,948

FRONT MOUNTED DETHATCHING APPARATUS

FIELD OF THE INVENTION

This invention relates to a dethatching apparatus mountable on small lawn tractors or riding lawn mowers having a power takeoff shaft extending forwardly from the mower, with the dethatching device adapted to be supported by, and operated from, the mower chassis for removing thatch from lawns.

BRIEF DESCRIPTION OF THE PRIOR ART

U.S. Pat. No. 4,015,668 to Wilson relates to a cultivator which includes a wheel control assembly 134 (as shown in FIGS. 4 and 5 of that patent), comprising a foot-operable wheel actuator 155. In operation, the support wheel assembly 26 can be raised by movement of the foot-operable wheel actuator in the manner shown in FIG. 5. In this respect, this prior art patent is of some interest in relation to the capability of raising and lowering a dethatcher rotary head by means of a foot pedal control.

A patent of similar interest and pertinence is Martin et al U.S. Pat. No. 1,119,628 which depicts a furrower wherein the furrower can be raised or lowered by means of a foot lever. Pressing don upon the foot lever raises all of the plows, as shown in FIG. 1 of this patent.

U.S. Pat. No. 3,739,856 issued to Ray shows an aerator-type attachment structure for aerating the soil. The aerating plates carried on a drum or shaft are polygonally-shaped, and are staggered circumferentially in axially spaced relation along the shaft.

Soteropulos U.S. Pat. No. 2,946,169 discloses a field forage harvester where a drum with blades carried thereon is caused to rotate rapidly, and the severed crop is then forced upwardly and outwardly through an opening or discharge stack in the top of the housing.

Warner U.S. Pat. No. 2,722,795 discloses a racking attachment which is mounted ahead of a riding lawn mower and is designed to cut the roots of undesirable grasses growing in a lawn, and to give the other grasses increased aeration to greatly improve the growth of the desirable ornamental grasses. The shaft which carries these blades is connected to a prime mover on the large, wheel-supported chassis.

BRIEF DESCRIPTION OF THE PRESENT INVENTION

The present invention is a wheeled vehicle which may typically be a riding-type lawn mower which is steered and guided at the forward end of the lawn mower by a person sitting on top of a primary or principal chassis having a pair of supporting wheels on opposite sides thereof. The wheeled vehicle of the present invention has a pair of forwardly projecting, horizontally spaced support arms which are pivotally mounted at one of their ends to the chassis. The arms carry or support a rotary dethatching drum at the forward ends thereof, and this drum can be adjusted upwardly or downwardly in its position relative to the ground.

The dethatching drum is enclosed in a volute housing which has an opening at the upper forward side thereof to permit thatch and grass particles to be discharged out through this opening in the drum housing when the device is in operation. The dethatching drum includes a plurality of axially-spaced blades mounted in circumferentially staggered array upon a polygonally cross-sectioned shaft. The dethatching drum and its housing are supported during operation on a vertically adjustable support roller used to set the working depth of the dethatching blades when they are in operation. The dethatching drum which carries the blades is driven in rotation from the wheeled vehicle by a power take-off shaft and gear box which drive a chain which is drivingly connected to the shaft of the drum.

An important feature of the invention is the provision of a pair of L-shaped lever arms projected from the wheeled vehicle toward the dethatching drum and functioning to support a foot pedal subassembly. This foot pedal subassembly, by its actuation, can be used to cause the dethatching drum and its housing to be lifted upwardly by foot pedal pressure applied by the operator.

GENERAL DESCRIPTION OF THE DRAWINGS

FIG. 1 is a plan view of the dethatching apparatus of the invention mounted on the front end of a wheeled vehicle, such as a riding lawn mower, with the vehicle shown in dashed lines.

FIG. 2 is a side elevation view of the dethatching device, and showing in dashed lines a portion of the wheeled vehicle to which it is mounted.

FIG. 5 is a view, partially in section and partially in elevation, showing the dethatching device as it appears when viewed from above, and having a part of the dethatching drum housing sectioned to illustrate the way the dethatching blades are mounted on the shaft of the drum. A part of the foot control for elevating the dethatcher is broken away for clarity of illustration.

DETAILED DESCRIPTION OF A PREFERRED EMBODIMENT OF THE INVENTION

Figure 3:
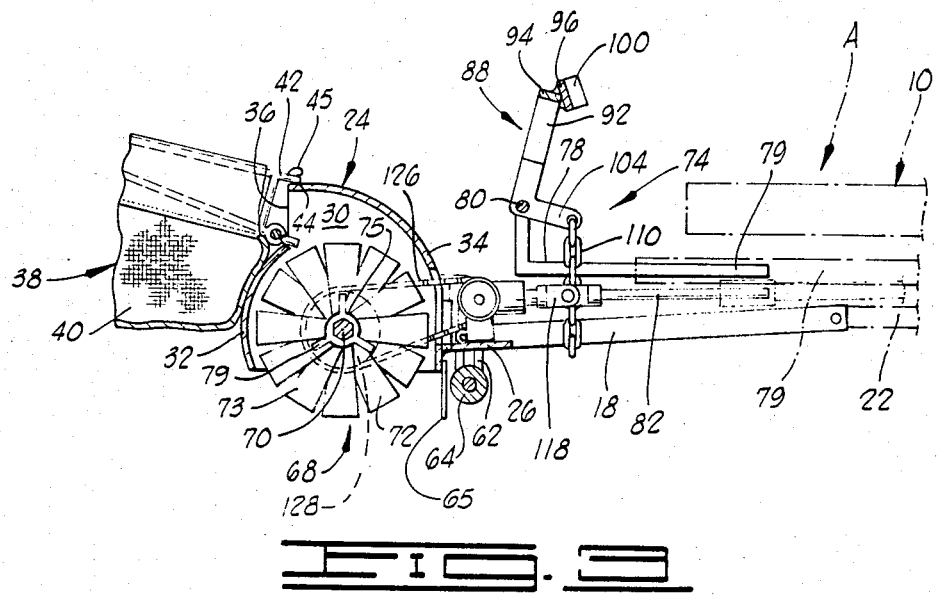
FIG. 3 is a sectional view taken along line 3—3 of FIG. 1.

Referring initially to FIG. 1, a wheeled vehicle, such as a front end steered, powered riding lawn mower, is designated generally by reference numeral 10. The vehicle 10 includes forward wheels 12 on opposite sides of a chassis 13 having a forward end 14 at the forward side thereof. A pair of elongated, forwardly extending, horizontal support arms 16 and 18 are located on opposite sides of the vehicle 10. The support arms 16 and 18 are pivotally connected to certain structural members of the vehicle, as illustrated at 20 and 22, so as to facilitate the vertical pivotation of the support arms 16 and 18 about a substantially horizontal axis.

Figure 4:
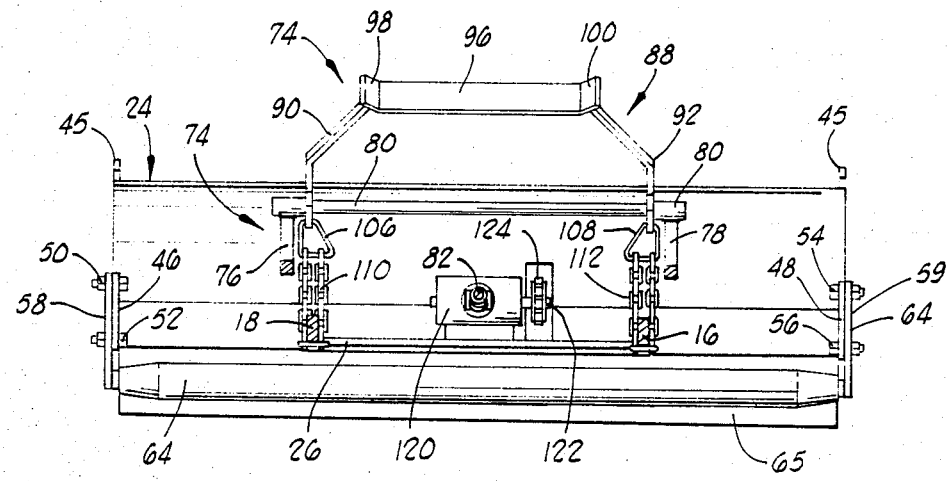
FIG. 4 is a sectional view taken along line 4—4 of FIG. 1.

At their forward ends, the support arms 16 and 18 are secured to the rear side of a dethatching drum housing 24, and to the upper side of a transversely extending prime mover mounting plate 26 which extends horizontally across the central portion of the rear side of a rotary dethatching drum housing 24 (see FIGS. 3-5).

The rotary dethatching drum housing 24 is in the shape of a volute which has a pair of end plates 28 and 30 (see FIGS. 2 and 5) at its opposite ends. The end plates 28 and 30 are interconnected by an arcuate forward plate 32 and by a volute-shaped, arcuate thatch deflecting plate 34. The arcuate thatch deflecting plate 34 terminates at a location spaced above the upper edge of the arcuate forward plate 32 so as to define a forwardly facing opening 36. This facilitates the discharge through this opening 36 of thatch which has been picked up by the dethatching blades and carried upwardly in the volute housing.

In order to catch the thatch as it is discharged from the opening 36, a large, open topped thatch-catching bag assembly, designated generally by reference numeral 38, is quick detachably mounted on the forward side of the dethatching drum housing. The open topped bag assembly 38 has a fabric cover 40 mounted on a frame 42 (see FIGS. 1 and 2). The open top of the bag assembly faces the opening 36 in the housing 24 to catch thatch which is discharged from the housing. A pair of rearwardly curved hooks 45 are secured to opposite sides of the housing 24 nd are used to detachably retain the bag assembly 38 on the housing. The hooks 45 engage eye rings 44 carried on the frame 42.

Projecting rearwardly from the housing 24 at its opposite ends are a pair of mounting flanges 46 and 48. Each of the mounting flanges 46 and 48 carries a pair of holes through which are extended a pair of bolts. This includes bolts 50 and 52, in the case of the mounting flange 46, and bolts 54 and 56 in the case of the mounting flange 48. The threaded shanks of the bolts 50–56 extend through a pair of slotted roller adjusting plates 58 and 59. Thus, the roller adjusting plate 58 having a slot 60 therein receives the threaded shanks of the bolts 50 and 52. The bolts 54 and 56 are passed through a slot 62 in the adjusting plate 59. The two roller adjusting plates 58 and 59 bear flatly and slidably against the two mounting flanges 46 and 48, respectively.

The threaded shanks of the several bolts 50–56 receive threaded nuts which can be tightened on the bolts to adjust the position of the respective adjusting plates 58 and 59 in relation to the adjacent mounting flanges 46 and 48. This adjustability permits an elongated steel gauge roller 64 which extends completely across the lower, rear side of the drum housing 24 to be adjusted upwardly and downwardly in order to set the depth to which the dethatching blades will penetrate or cut into the thatch which is to be removed from a lawn.

In order to protect the roller from rearwardly thrown thatch, an elongated flap 65 is secured along its upper edge to the rear side of the housing 24, and hangs downwardly therefrom.

Mounted within the rotary drum housing 24 for rotation about a horizontal axis is a dethatching rotor or drum, designated generally by reference numeral 68. The dethatching drum 68 is mounted in the drum housing 24 for rotation about a horizontal axis by means of an elongated shaft 70 which projects at its opposite ends through the end plate 26 and 28 of the housing 24. The ends of the shaft 70 are rotatably supported within suitable journals 71 and 72 bolted to the respective end plates 28 and 30. As will be perceived in referring to FIG. 3, the elongated shaft 70 has a major portion of its length formed in a polygonally cross-sectional configuration, with a hexagonal cross-sectional configuration being here illustrated as typical of one embodiment of the invention. A plurality of sharpened dethatching blades 73 are then secured in circumferentially staggered array to the shaft by means of central hub sections which define hexagonally-shaped openings therethrough, and thus permit the blades to be secured on the shaft in a variety of different positions therearound as best shown in FIGS. 3 and 5. The blades may, in a different embodiment, each have a twelve sided opening through the center thereof.

The dethatching blades 73 are axially spaced from each other along the shaft 70 by means of spacer blocks 75 as shown in FIGS. 3 and 5. Each of the spacer blocks 75 carries three radially projecting paddles or fins 79 thereon, also as shown in FIG. 3. During operation of the dethatching apparatus, these paddles create the air flow needed to force the thatch through the opening 36 and into the ba assembly 38.

In order to permit an operator, seated on the mower at the approximate location A shown in FIG. 2, to cause the dethatching attachment to be elevated out of contact with, and spaced above the ground, a foot-operated dethatching drum elevating subassembly, designated generally by reference numeral 74 is provided. The dethatching drum elevating subassembly is mounted between the location A of the operator seated on the front of the mower, and the dethatching drum 68 an its housing 24, which are disposed forwardly of the mowing machine.

The foot-operated dethatching drum elevating subassembly 74 includes a pair of forwardly projecting, horizontally spaced, L-shaped lever arms 76 and 78. These lever arms 76 and 78 are slidably supported at their rear ends in sleeves 77 and 79 carried on the vehicle 10, and they function to support a pivot shaft 80 which extends horizontally transversely across the center of the apparatus above a power take-off shaft 82, hereinafter described in greater detail. The pivot rod 80 supports a generally trapezoidally-shaped foot pedal bracket designated generally by reference numeral 88. The foot pedal bracket 88 includes a pair of upwardly and inwardly bent arms 90 and 92 which are joined to the opposite ends of a central support rod 94 (as shown in FIG. 1).

The support rod 94 supports an upwardly and rearwardly facing foot pedal plate 96 which carries a pair of upwardly bent end portions 98 and 100. The arms 90 and 92 carry rearwardly extending lever toes 102 and 104, respectively, which are pivoted upwardly about a horizontal axis when the foot pedal plate 96 is pushed forwardly and downwardly. This occurs by reason of the pivot shaft extending through and journalling the lower ends of the arms 90 and 92. The rear ends of the lever toes 102 and 104 have a pair of rings 106 and 108 secured through openings formed therein, and these rings each carry a pair of lift chains 110 and 112 as best shown in FIG. 4. The lift chains 110 and 112 are secured around an intermediate portion of the support arms 16 and 18. As has been explained, the support arms 16 and 18 are pivotally secured at one of their ends to the chassis of the wheeled vehicle, and carry at their other ends, the rotary dethatching drum housing which has the dethatching rotor or drum 68 rotatably mounted therein. Thus, when the foot pedal plate 96 is pushed forwardly and downwardly, this has the effect of causing the lever toes 102 and 104 to be pivoted upwardly, thereby pulling upwardly on the lift chains 110 and 112 and lifting the support arms 16 and 18 and the roller 64 so that it is spaced above the ground in a transport or obstacle clearing position. The force required to lift the support arms and the housing 24 and drum 68 upwardly is substantially reduced by the provision of springs 114 and 115 which are connected between the support arms and the lever arms as shown in FIG. 6.

Power for driving the dethatching drum 68 in rotation is developed by a prime mover (not shown) carried on the wheeled, front end steered vehicle 10. The power is transmitted through a drive shaft 116 to a power take-of shaft 82. The power take-off shaft 82, which is driven in rotation by the prime mover, is connected through a universal joint 118 to a gear box 120 mounted on the rotary dethatching drum housing 24 by securement to the upper side of the support plate 26. The gear box 120 transmits the motion of the power take-off shaft 82 through an output shaft 122 to a drive sprocket 124. The drive sprocket 124 drives an elongated endless flexible chain 126. The chain 126 is passed around a large toothed driven sprocket 128 mounted upon the shaft 70 and keyed thereto for rotation with the shaft and for permitting the drive system to drive the shaft in rotation. By the described drive components, the dethatching drum 68 can be caused to undergo rotation, and the power for driving it through high or low grass can be varied, at will, by the operator sitting at the locus A on the wheeled vehicle.

OPERATION

In operating the dethatching apparatus of the invention, the depth to which the dethatching blades 73 will be projected into the ground during rotation of the dethatching drum can be adjusted as desired. For this purpose, the bolts 50–56 are varied in their positions in the roller adjusting plates, 58 and 59, as these plates are secured to the mounting flanges 46 and 48.

The dethatching apparatus is operated by an operator sitting on the forward side of the wheeled vehicle 10, such as a front steered, power lawn mower. Projecting from the chassis of the lawn mower or wheeled vehicle are the support arms 16 and 18, which arms have their rear ends pivotally connected to the chassis of the wheeled vehicle, and their forward ends connected to the dethatching drum housing 24. During operation of the apparatus, the dethatching drum 68 and its housing 24 can be lifted upwardly by means of the foot operated subassembly 74. Thus, when the foot pedal plate 96 is pushed forwardly by the foot of the operator, the rearwardly extending lever toes 102 and 104 are pivoted upwardly about the fulcrum points where the foot pedal bracket arms 90 and 92 are joined to the L-shaped arms 76 and 78. Upward pivotation of the rearwardly extending lever toes 102 and 104 lifts upwardly on the lift chains 110 and 112. This lifting up of the lever toes 102 and 104 is aided by the springs 114 and 115, overcomes the weight of the rotary dethatching drum 68 and the dethatching drum housing 24 to lift these structures upwardly. In this fashion, the drum 68 can be lifted up and fixed in a transport or inoperative position, or the dethatching drum can be periodically lifted quickly and easily by depressing the foot pedal 96 so as to cause the arms carrying the drum housing and the drum to be lifted upwardly to clear obstacles.

The arrangement of the blades 73 in the drum 68 is important to the efficient operation of the machine. Thus, they are circumferentially staggered or off-set in relation to each other in their axial spacing along the shaft 70.

As thatch is removed by the rotation of the rotary dethatching drum 68, it is carried upwardly in the housing 24 and is discharged through the forwardly facing opening 36 at the upper, forward side of the dethatching drum housing. The thatch, grass and debris which is thus discharged through the opening 36 passes into the thatch-catching bag 38 and the bag continues to receive the thatch until it is substantially loaded. At that time, it can be quickly detached from the rotary dethatching drum housing 24 and emptied. This can be most easily accomplished by simply detaching the frame 42 from the mounting hooks on the housing 24.

Although a preferred embodiment of the invention has been herein described, it will be understood that various changes and innovations can be made in the illustrated and described structure without departure from the basic principles which underlie the invention. Changes of this sort are therefore deemed to be circumscribed by the spirit and scope of the invention, except as the same may be necessarily limited by the appended claims or reasonable equivalents thereof.

What is claimed is:

1. A dethatching apparatus comprising:

a main chassis having a forward side and a rear side;

wheels rotatably mounted on said chassis for ground engagement and supporting the chassis on the ground for movement thereover;

a pair of spaced supporting arms each having a forward end and each having a rear end pivotally connected to said chassis for pivotation about a substantially horizontally extending pivotal axis, said arms projecting substantially horizontally from the forward side of said chassis in the direction of forward movement of the chassis over the ground, said arms extending generally parallel to, and spaced above, the ground;

a rotary dethatching drum housing connected to the forward ends of said supporting arms and movable upwardly with said supporting arms when said supporting arms are pivoted upwardly about said horizontally extending pivotal axis, said housing having two opposed, substantially parallel end walls laterally spaced from each other;

a first shaft rotatably mounted in said housing and extending in a direction which is generally perpendicular to said supporting arms, said shaft being rotatably journalled in the end walls of said housing, and having a polygonal cross-sectional configuration;

a plurality of dethatching blades secured to said shaft over a major portion of its length in successively circumferentially off-set, staggered array with respect to each other, each of said blades including a centrally apertured hub portion keyed to said polygonally cross-sectioned shaft for rotation therewith, said blades and shaft together forming a rotary dethatching drum, and said blades and dethatching drum housing cooperating to direct thatch out of an opening in the upper side of said housing and in a forward direction, when said dethatching drum is rotated;

a drive shaft having a forward end and a rear end, and extending from said chassis toward said dethatching drum housing;

a gear box connected to the forward end of said drive shaft and located on said dethatching drum housing;

a flexible drive member drivingly connected between said gear box and said first shaft for driving said first shaft and the blades secured thereto in rotation;

a pair of horizontally spaced lever arms connected to the forward side of said chassis and projecting forwardly therefrom, each of said lever arms having a forward end and a rear end;

pedal means pivotally connected to the forward ends of said horizontally spaced lever arms at fulcrum points for pivotation about a horizontal axis and including lift toe portions projecting in a rearward direction toward said chassis, said pedal means being positioned relative to said chassis to permit a person seated on the forward side of said chassis to reach said pedal means with his feet; and lifting elements connected between said lift two portions and intermediate points along each of said pair of spaced supporting arms between the ends thereof to facilitate lifting said spaced supporting arms and the rotary drum and the rotary drum housing, all concurrently and upwardly relative to the ground, when said foot pedal means is pushed to cause it to pivot about said fulcrum points.

2. A dethatching apparatus as defined in claim 1 wherein said dethatching apparatus further includes means adjustably supporting said dethatching drum housing and said pair of spaced supporting arms to permit the height of said housing and the dethatcher drum carried therewithin to be adjusted relative to the ground.

3. A dethatching apparatus as defined in claim 1 wherein said dethatching drum housing is of volute configuration and defines a horizontally extending, forwardly facing grass and thatch discharge opening at the upper side thereof.

4. A dethatching apparatus as defined in claim 1 and further characterized as including spring means connected between said lever arms and said support arms biasing said support arms in an upward direction.

5. A dethatching apparatus as defined in claim 4 and further characterized as including:
 a thatch receiving bag assembly detachably mounted on said dethatching drum housing and adjacent said thatch discharge opening and defining an opening for receiving thatch discharged through said thatch discharge opening, said bag assembly including:
 a framework; and
 a flexible fabric cover covering said framework; and
 hooks on said dethatching drum housing detachably engaging said framework.

6. A dethatching apparatus as defined in claim 1 wherein said lifting elements are flexible chains.

7. A dethatching apparatus as defined in claim 1 and further characterized as including:
 a substantially horizontally extending gauge roller rollably contacting the ground at a location spaced forwardly from said chassis, and extending transversely across the path of forward travel of said dethatching apparatus and substantially normal to said supporting arms; and
 means adjustably mounting said roller on said dethatching drum housing for selective vertical adjustment thereon to thereby selectively set the distance to which said dethatching blades will penetrate ground-supported lawn thatch.

* * * * *

UNITED STATES PATENT AND TRADEMARK OFFICE
CERTIFICATE OF CORRECTION

PATENT NO. : 4,910,948
DATED : March 27, 1990
INVENTOR(S) : Danny Nelson

It is certified that error appears in the above-identified patent and that said Letters Patent is hereby corrected as shown below:

In Column 1, line 26, delete "don" and insert --down--.
In Column 4, line 6, delete "ba" and insert --bag--.

In the Claims:
In Column 7, line 4, delete "two" and insert --toe--.

Signed and Sealed this

Seventh Day of May, 1991

Attest:

HARRY F. MANBECK, JR.

Attesting Officer

Commissioner of Patents and Trademarks